United States Patent [19]

Kawaguchi et al.

[11] 4,420,454
[45] Dec. 13, 1983

[54] METHOD OF MAKING A PLASTIC HOLLOW ARTICLE

[75] Inventors: Kiyoshi Kawaguchi, Yokohama; Muneki Yamada, Fujisawa; Nobuyuki Kato, Yokohama; Fumio Kanou, Yokohama; Akira Sakamoto, Yokohama; Minoru Mitsuhashi, Tokyo, all of Japan

[73] Assignee: Toyo Seikan Kaisha, Limited, Tokyo, Japan

[21] Appl. No.: 355,147

[22] Filed: Mar. 5, 1982

[51] Int. Cl.³ ............. B29C 17/03; B29C 17/04; B29D 9/04
[52] U.S. Cl. ..................... 264/512; 264/550; 264/322; 264/323
[58] Field of Search ............ 264/522, 544, 549, 550, 264/322, 323, 512, 514, 515

[56] References Cited

U.S. PATENT DOCUMENTS

| | | | |
|---|---|---|---|
| 2,854,694 | 10/1958 | Mumford | 264/550 |
| 3,184,524 | 5/1965 | Whiteford | 264/94 |
| 3,757,118 | 9/1973 | Johnson | 264/89 |
| 3,814,784 | 6/1974 | Wolf | 264/549 |
| 4,122,147 | 10/1978 | Vrcelj | 264/255 |
| 4,354,996 | 10/1982 | Nishiyama et al. | 264/323 X |

Primary Examiner—Jan H. Silbaugh
Attorney, Agent, or Firm—Armstrong, Nikaido, Marmelstein & Kubovcik

[57] ABSTRACT

The peripheral portion of a flat, molecularly orientable material stock of substantially uniform thickness having a temperature below the upper limit of the molecularly orientable temperatures of the plastic material is clamped, and the central portion of the plastic material stock is introduced into a die cavity while compressing the central portion with an upper plunger and a lower plunger, thereby forming a hollow preform having a sidewall portion made from the plastic material which has been forced out from between the upper plunger and the lower plunger, while the sidewall portion is kept in contact with the side surface of the upper plunger kept at about molecularly orientable temperature. Thereafter, while the upper plunger is returning, a fluid under pressure is supplied into the hollow preform to expand radially the sidewall portion, so that the sidewall portion is brought into contact with the inner surface of the die cavity kept at a temperature below the lower limit of the molecularly orientable temperatures for cooling and solidifying. Thus, the sidewall portion of a plastic hollow article is formed from the sidewall portion of the hollow preform, and a plastic hollow article having a flange portion, the sidewall portion which is molecularly oriented, and a bottom wall portion is made.

15 Claims, 18 Drawing Figures

METHOD OF MAKING A PLASTIC HOLLOW ARTICLE

BACKGROUND OF THE INVENTION

1. Field of the Invention

The present invention relates to a method of making a plastic hollow article and, more particularly, to a method which is particularly suitable for making a can-shaped plastic hollow article such as a container having a molecularly oriented thin sidewall portion and a large ratio of the height to the diameter.

2. Description of the Prior Art

There is disclosed in U.S. Pat. No. 3,184,524 a method for producing a can-shaped plastic hollow article having a molecularly oriented sidewall portion with improved transparency, strength, and gas barrier. According to this method, the sidewall portion is formed by, at first, making a plastic preform by injection molding or the like, and then forcing the central portion of the preform into a mold cavity under pressure, while clamping the periphery of the preform and keeping the central portion at molecularly orientable temperature. This method, however, may be disadvantageous in that it requires a step to form the preform, it is difficult to prepare the preform from a laminate, and it is necessary to heat the preform uniformly to a molding temperature before it is forced into the mold cavity.

There is also disclosed in U.S. Pat. No. 4,122,147 a method for producing two-layer can-shaped plastic containers. However, this method is concerned with the melt molding which cannot be applied to the production of thin-walled plastic containers having the improved transparency and other properties resulting from molecular orientation.

SUMMARY OF THE INVENTION

It is a major object of the present invention to provide a method for making a can-shaped plastic hollow article having a thin sidewall portion with improved transparency, gas barrier, and other container properties resulting from molecular orientation, a flange portion, and a large ratio of the height to the diameter, from a flat and substantially uniformly thick plastic material stock which can undergo molecular orientation.

It is another object of the invention to provide a method for making a can-shaped plastic hollow article having a thin flange portion or a flange portion having a sectional configuration suitable for sealing (such as double seaming, clinching, and heat sealing) with a lid, from a flat and substantially uniformly thick plastic material stock which can undergo molecular orientation.

According to one embodiment of the present invention, the peripheral portion of a flat, molecularly orientable plastic material stock of substantially uniform thickness having a temperature below the upper limit of the molecularly orientable temperatures of the plastic material is clamped, and the central portion of the plastic material stock is introduced into a die cavity while compressing the central portion with an upper plunger and a lower plunger, thereby forming a hollow preform having a sidewall portion made from the plastic material which has been forced out from between the upper plunger and the lower plunger, while the sidewall portion is kept in contact with the side surface of the upper plunger kept at about molecularly orientable temperature. Thereafter, while the upper plunger is returning, a fluid under pressure is supplied into the hollow preform to expand radially the sidewall portion, so that the sidewall portion is brought into contact with the inner surface of the die cavity kept at a temperature below the lower limit of the molecularly orientable temperatures for cooling and solidifying. Thus, the sidewall portion of the plastic hollow article is formed from the sidewall portion of the hollow preform, and a plastic hollow article having a flange portion, the sidewall portion which is molecularly oriented, and a bottom wall portion is made.

According to another embodiment of the present invention, a step of compressing the peripheral portion prior to or during introducing the central portion into the die cavity, or after forming the hollow preform and prior to returning the upper plunger, such that the plastic material of the peripheral portion flows substantially radially outwardly, is added to the aforementioned method of making a hollow plastic article, whereby a thin flange portion or a flange portion having a desired sectional configuration is formed.

According to the foregoing embodiments, the plastic material of the peripheral portion will hardly flow radially inwardly by compression, before the bottom surface of the upper plunger is brought into contact with the top surface of the plastic material stock, and thus a rupture at the boundary between the sidewall portion and the flange portion or its vicinity can be prevented from occuring during forming the hollow preform.

According to a preferable embodiment of the present invention, in the foregoing processes of making a hollow plastic article, the compressing force by the upper plunger and the lower plunger is kept comparatively high in the former stage of introducing the plastic material stock into the die cavity, thereby causing the plastic material forced out to fill substantially the space between the upper plunger and the inner surface of the die cavity, and thereafter the compressing force is reduced and the introducing is continued, thereby permitting the filled plastic material to be drawn in the axially direction.

Thus, there can be made without rupture a can-shaped plastic hollow article having a thin sidewall portion with a substantially uniform thickness and improved transparency, strength, and gas barrier and so on, and a large ratio of the height to the diameter (for example, 1.5 to 3.0).

Other objects and advantages will be apparent from the following detailed description and claims and the attached drawings.

BRIEF DESCRIPTION OF THE DRAWINGS

FIG. 9 shows schematic vertical sectional views of the constituents of a plastic material stock placed one over another;

FIG. 9 (a) shows a plastic material stock composed of plastic sheets of different kinds;

FIG. 9 (b) shows a plastic material stock composed of plastic sheets and laminates;

FIG. 9 (c) shows a plastic material stock composed of laminates;

FIG. 9 (d) shows a plastic material stock composed of plastic sheets of the same kind;

FIG. 10 shows vertical sectional views illustrating the important part of the first example of the device which is capable of forming the thin flange portion;

FIG. 10 (a) shows the device which is in the stage before compressing the flange portion;

FIG. 10 (b) shows the device which is in the stage after forming the thin flange portion by compression;

FIG. 11 shows vertical sectional views illustrating the important part of the second example of the device which is capable of forming the thin flange portion;

FIG. 11 (a) shows the device which is in the stage before compressing the flange portion;

FIG. 11 (b) shows the device which is in the stage after forming the thin flange portion by compression;

FIG. 12 shows vertical sectional views illustrating the important part of the device which is capable of forming a flange portion having a predetermined sectional configuration;

FIG. 12 (a) shows the device which is in the stage before compressing the flange portion;

FIG. 12 (b) shows the device which is in the stage after shaping the flange portion by compression.

DETAILED DESCRIPTION OF THE INVENTION

Figure 1:
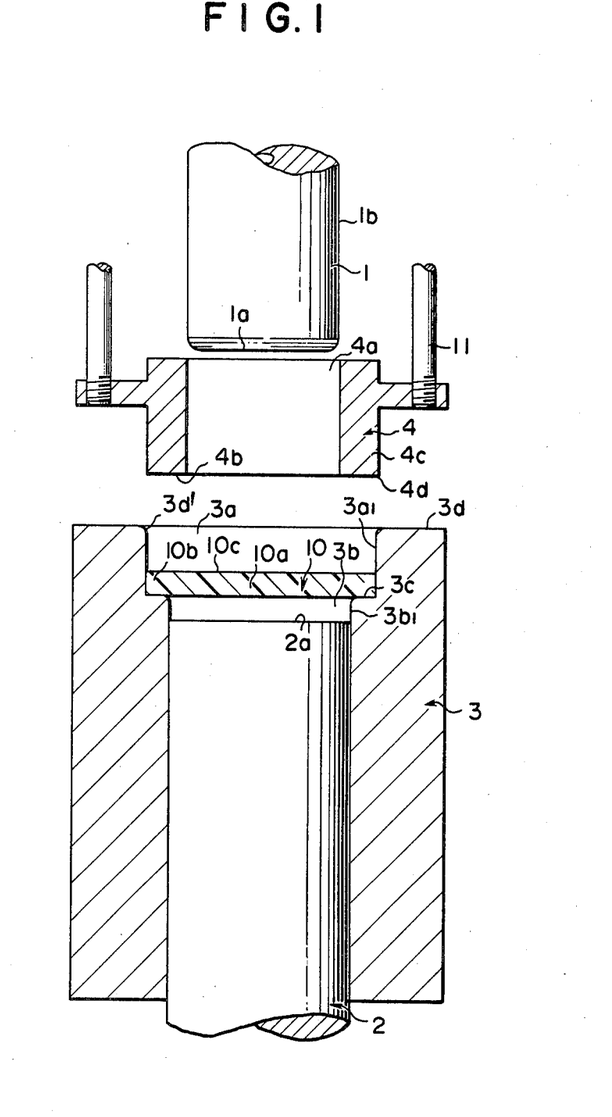
FIG. 1 is a schematic vertical sectional view showing an example of the device used for practicing the invention.

Referring first to FIGS. 1 to 7 of the attached drawings, therein illustrated are an upper plunger 1, a lower plunger 2, a die 3, and a clamping pad 4. The die 3 is fixed to a holding member which is not shown. As shown in FIG. 1, the die 3 has an upper cavity $3a$ and a lower cavity $3b$. The upper cavity $3a$ is of a short cylindrical shape and has an inside diameter which is approximately equal to the outside diameter of the flange portion $5a$ of a plastic hollow article 5 to be formed (refer to FIG. 6). The lower cavity $3b$ is of a cylindrical shape and has an inside diameter which is equal to the outside diameter of the sidewall portion $5b$ of the plastic hollow article 5 to be formed. The inside surface $3a_1$ of the upper cavity $3a$ is connected to the inside surface $3b_1$ of the lower cavity $3b$ through a horizontal step $3c$.

Figure 5:
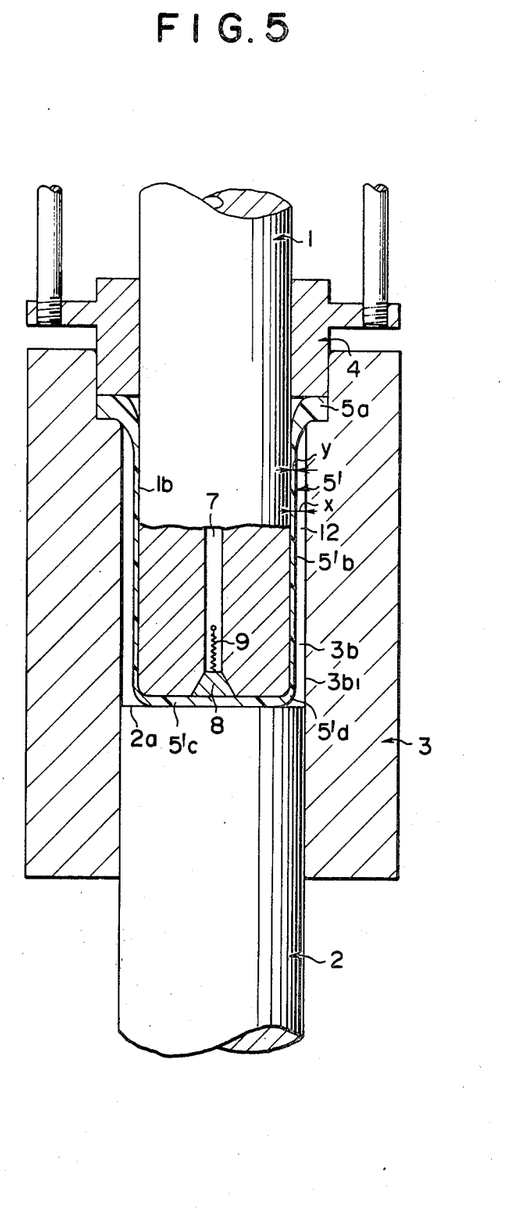
FIG. 5 is a vertical sectional view showing the device as shown in FIG. 1 which is in the stage of having finished the forming of a hollow preform by compression and drawing.

The outside diameter of the upper plunger 1 is dimensioned such that the clearance x between the upper plunger 1 and the inside surface $3b_1$ of the lower cavity $3b$ is greater than the wall thickness y of the sidewall portion $5'b$ of the hollow preform $5'$ to be formed (refer to FIG. 5). The difference between x and y is, for example 0.2 to 0.8 mm. The upper plunger 1 is provided with a bore 7 extending along the axial direction. The lower opening of the bore 7 is ordinarily kept closed by a plug 8 of truncated conical shape which is adapted to be usually pulled upwardly by a spring 9 (refer to FIG. 5). The bore 7 communicates through a conduit and an electromagnetic valve (not shown) with a source of compressed air (not shown). These elements are so arranged that the electromagnetic valve is opened by a limit switch (not shown) when the bottom surface $1a$ of the upper plunger 1 is positioned approximately below the step $3c$ of the die 3, and the compressed air is supplied through the bore 7. The upper plunger 1 is made of metal (such as tool steel), and preferably has a smooth, surface-treated hard layer (such as hard chrome plated layer) thereon. Further, the upper plunger 1 has a built-in heater (not shown) which keeps at least the bottom surface $1a$ and the side surface $1b$ up to the height about equal to that of the sidewall portion $5b$ of the plastic hollow article 5 to be formed, at an approximate molecularly orientable temperature of the plastic material composing the hollow article 5.

The lower plunger 2 is constructed in such a manner that it is slidable along the lower cavity $3b$. The top surface $2a$ is preferably coated with a smooth, surface-treated hard layer so that the plastic material is forced out easily by compression, as mentioned hereinafter. The clamping pad 4 has a hollow portion $4a$, and the upper plunger 1 is adapted to slide along the inside surface of the hollow portion $4a$. The clamping pad 4 has a flat bottom surface $4b$ that faces the step $3c$. The lower portion $4c$ of the clamping pad 4 has an outside diameter which is equal to or sightly smaller than the inside diameter of the upper cavity $3a$, so that the lower portion $4c$ can move vertically in the upper cavity $3a$. The clamping pad 4 is moved vertically through rods 11 by a driving mechanism such as a hydraulic unit (not shown).

The upper plunger 1 and the lower plunger 2 are also moved vertically by a driving mechanism such as a hydraulic unit (not shown). In downward movement, the difference between the speeds of the upper plunger 1 and the lower plunger 2 is controlled by a control mechanism (not shown), so that a controlled compression force is applied to the central portion $10a$ of a plastic material stock 10 when it is held between the bottom surface $1a$ of the upper plunger 1 and the top surface $2a$ of the lower plunger 2 and is introduced into the lower cavity $3b$.

The plastic material stock 10 is made of a molecularly orientable synthetic thermoplastic. Examples of such a thermoplastic include crystalline polyolefin resins such as isotactic polypropylene, high-density polyethylene, medium-density polyethylene, and low-density polyethylene; linear polyester resins such as polyethylene terephthalate; polycarbonate; polyvinyl chloride; nitrile resin; and copolymers or blends thereof. In case where the intended plastic hollow article does not need transparency, the plastic material may be incorporated with a filler such as talc, calcium carbonate, and mica flakes. The plastic material stock 10 is prepared by cutting to a predetermined size a sheet of the molecularly orientable thermoplastic material, or a laminate sheet or a blend sheet composed of the molecularly orientable thermoplastic material and an oxygen barrier resin such as ethylene-vinyl alcohol copolymer, polyamide, cellulosic resin, polyacrylonitrile, polyvinylidene chloride, and polyvinyl alcohol. The plastic material stock 10 has a substantially uniform thickness, preferably from about 0.5 to 6 mm, more preferably from about 2 to 4 mm. If it is thinner than about 0.5 mm, when the hollow preform $5'$ is formed, breakage tends to occur, particularly at the bottom portion thereof. On the other hand, if it is thicker than about 6 mm, breakage tends to take place near the flange portion of the hollow preform $5'$.

Figure 9A:
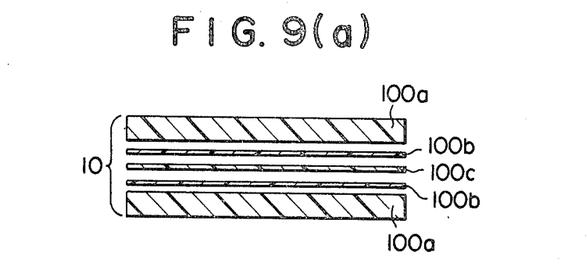
Figure 9B:
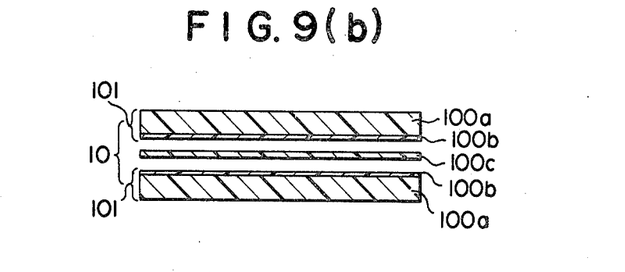
Figure 9C:
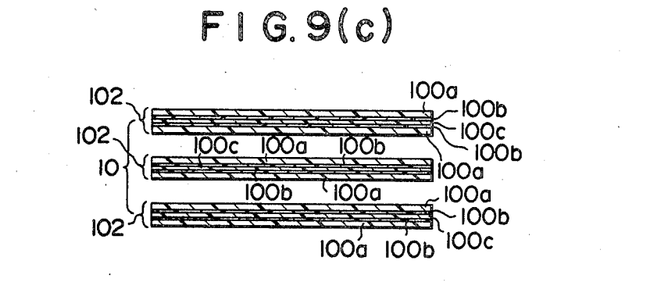
Figure 9D:
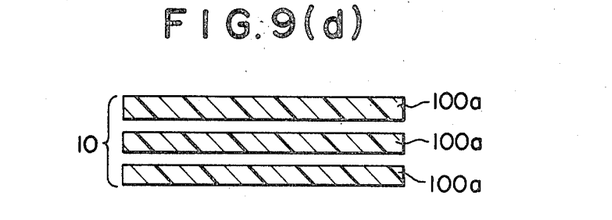

In case where laminates are used as the stock, they are usually bonded by adhesive layers into an integral sheet. In this invention, however, it is not always necessary to make an integral laminate sheet. The plastic material stock 10 may be composed of multiple layers of a molecularly orientable thermoplastic sheet 100a (such as polypropylene sheet 500 to 2000 μm thick), an adhesive sheet or film 100b (such as maleic anhydride-modified polypropylene film 50 to 150 μm thick), an oxygen barrier thermoplastic sheet or film 100c (such as ethylene-vinyl alcohol copolymer film 200 to 400 μm), the adhesive sheet or film 100b, and the molecularly orientable thermoplastic sheet 100a, which are simply placed one over another without bonding, as shown in FIG. 9 (a) (in which the gaps between the layers are exaggerated for illustration, and in actual there are almost no gaps). The reason why the constituting layers need not to be bonded together is that they are bonded completely, except the flange portion 5a, during the process in which the plastic material at the molecularly orientable temperature thereof is compressed between the upper plunger 1 and the lower plunger 2 and forced out along the side surface 1b of the upper plunger 1. Presumably, this bonding is caused by slipping under pressure between the layers at the molecularly orientable temperature. This bonding also takes place in the flange portion 5a when the layers are compressed in the manner as shown in FIG. 10 and FIG. 11 mentioned later.

The use of the plastic material stock of the multiple layers as mentioned above has the following advantages. (a) Waste after cutting (or punching) the stock can be recovered. (b) Problems encountered in thick laminates, for example, 2 to 6 mm thick can be solved. The production of thick laminates by, for instance, melt coextrusion involves problems such as difficulty in winding-up, low production speed due to a low cooling rate, and poor formability due to the increase in the size of microcrystallines. (c) Preheating time can be reduced where the plastic hollow article is formed from a preheated plastic material stock.

Alternative examples of the plastic material stock 10 are shown in FIG. 9. In FIG. 9 (b), the plastic material stock 10 is composed of an oxygen barrier plastic sheet or film 100c sandwiched by two pieces of laminates 101, each composed of a molecularly orientable thermoplastic sheet 100a and an adhesive sheet or film 100b. In FIG. 9 (c), the plastic material stock 10 is prepared by simply placing a plurality (3 in the figure) of comparatively thin laminates 102 one over another. In this case also, the bonding in the process of forming the hollow preform is achieved, as mentioned above, and the aforesaid merits (b) and (c) are obtained. Similarly, it is also possible to use the plastic material stock 10 prepared by simply placing a plurality (3 in the figure) of comparatively thin molecularly orientable thermoplastic sheets 100a as shown in FIG. 9 (d) one over another.

The diameter of the plastic material stock 10 is dimensioned such that the plastic material stock 10 can be placed on the step 3c and clamped by the clamping pad 4, with a predetermined width of the flange portion 5a. In other words, the diameter is approximately equal to the inside diameter of the inside surface $3a_1$ of the upper cavity 3a, or equal to an intermediate value of the above inside diameter and the inside diameter of the inside surface $3b_1$ of the lower cavity 3b.

The plastic material stock 10 is charged into the upper cavity 3a as shown in FIG. 1, preferably at normal room temperature (usually 10° to 40° C.) without preheating, and then formed. However, it may be formed after uniformly preheating to a prescribed temperature lower than the upper limit (Tu) of the molecularly orientable temperatures. The upper limit Tu means the melting point (defined in this specification as the peak temperature of the endothermic curve measured by differential thermal analysis under atmospheric pressure) in the case of crystalline thermoplastics such as isotactic polypropylene, and high-, medium-, and low-density polyethylene; a cold crystallization temperature in the case of crystalline thermoplastics such as polyethylene terephthalate having the cold crystallization temperature; and a melt flow starting temperature (defined in this specification as the temperature at which the sample resin starts to be discharged in melt from a nozzle, 1 mm in diameter and 10 mm long, when heated at a constant rate, under a plunger pressure of 160 kg/cm² using a Koukashiki flow tester specified in JIS K 6719) in the case of amorphous plastics such as polyvinyl chloride, nitrile resin, and polycarbonate.

The plastic material stock 10 may be also fed in the following manner. A sheet emerging from a sheet extrusion molding die (not shown) is cooled by a cooling roll to a prescribed temperature as mentioned above. Then the sheet is placed on the top surface 3d of the die 3. The clamping pad 4, which is used as a punching die also in this case, is lowered. The plastic material stock 10 is punched out from the sheet by the lower corner 4d of the pressing pad 4 and the opening corner 3d' of the upper cavity 3a of the die 3 (although the opening corner 3d' is curved in FIG. 1, it should be angular (not shown) when it is used as a punching die.). The plastic material stock 10 thus punched is placed on the step 3c.

The present inventors have found that, according to the present invention, the plastic material stock 10 can be formed without preheating into the hollow preform 5' which, except the flange portion, is kept at molecularly orientable temperature during the forming process in the case illustrated in FIGS. 1 to 5. One reason for this may be that heat is generated when the central portion 10a of the plastic material stock 10 is compressed by the upper plunger 1 and the lower plunger 2. The other reason may be that during the forming process the sidewall portion and the bottom wall portion of the hollow preform 5' come into contact with the side surface 1b and the bottom surface 1a of the upper plunger 1 which is kept at an approximate molecularly orientable temperature $(T_1)$, which ranges from the temperature about 20° C. lower than the lower limit $(T_L)$ of the molecularly orientable temperatures to the temperature about 60° C. higher than the upper limit (Tu) of the molecularly orientable temperatures, preferably from the temperature about 20° C. higher than the lower limit $(T_L)$ to the temperature about 20° C. higher than the upper limit (Tu). According to the method of this invention, the forming may preferably be carried out without preheating the plastic material stock 10, whereby an apparatus and a step for preheating can not be required.

The molecularly orientable temperature (To) as defined in this specification means a temperature at which the polymer chains of the molecularly orientable plastic material forming at least the sidewall portion 5b of the plastic hollow article 5 to be formed according to the method of this invention are oriented more than the orientation that would take place in the ordinary melt molding, with the result that the plastic hollow article 5 is improved in physical strength, gas barrier properties, and transparency and so forth. In the case of isotactic polypropylene, the temperature (To) is lower than the melting point thereof and higher than about 120° C. In the case of linear polyester resins such as polyethylene terephthalate, the temperature is higher than the glass transition temperature thereof and lower than the cold crystallization temperature thereof. In the case of amorphous resins such as polyvinyl chloride, nitrile resin, and polycarbonate, the temperature (To) is higher than the glass transition temperature and lower than the melt flow starting temperature. In the case of a laminate or multiple layers of polyolefin and ethylene-vinyl alcohol copolymer, the temperature (To) is lower than the melting point of the polyolefin resin and higher than (1.64 M+20)° C. (where M is the mol% of vinyl alcohol in the copolymer).

The plastic hollow article 5 is formed in the following manner using the above-mentioned forming apparatus.

Figure 2:
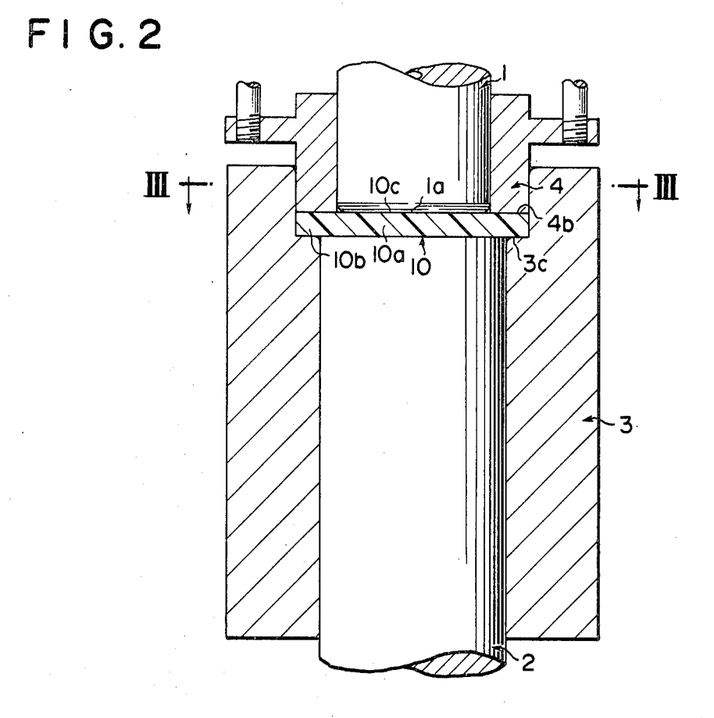
FIG. 2 is a vertical sectional view showing the device as shown in FIG. 1 which illustrates the state immediately prior to forming a plastic hollow article.
Figure 3:
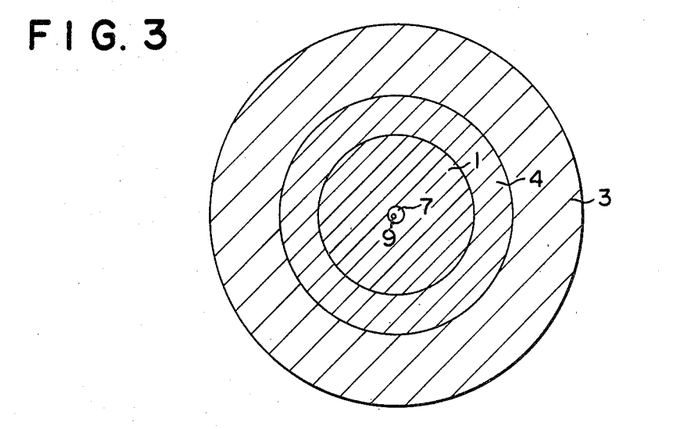
FIG. 3 is a transverse sectional view along the line III—III in FIG. 2.

The plastic material stock 10 is placed on the step 3c of the die 3, with the upper plunger 1 and the clamping pad 4 raised above the die 3, as shown in FIG. 1. In case where the plastic material stock 10 is preheated to a comparatively high molecularly orientable temperature, it is preferable to position the top surface 2a of the lower plunger 2 at the same level as the step 3c in order to prevent the central portion 10a of the plastic material stock 10 from sagging due to softening. Then, as shown in FIG. 2, the pressing pad 4 is lowered, and the peripheral portion 10b of the plastic material stock 10 is clamped under a prescribed pressure between the step 3c and the bottom surface 4b of the clamping pad 4. The clamping force, at least before the bottom surface 1a of the upper plunger 1 comes into contact with the top surface 10c of the plastic material stock 10, should be kept at such a value that the plastic material of the peripheral portion 10b is not compressed to an extent that radially inward material flow occurs, and the peripheral portion 10b can be held on the step 3c. If the clamping force is so great that the material is forced to flow radially inwardly, breakage often will occur near the boundary between the flange portion and the sidewall portion of the hollow preform 5′, presumably due to excessive shear strength applied to the plastic material by the lowering upper plunger 1.

Figure 4:
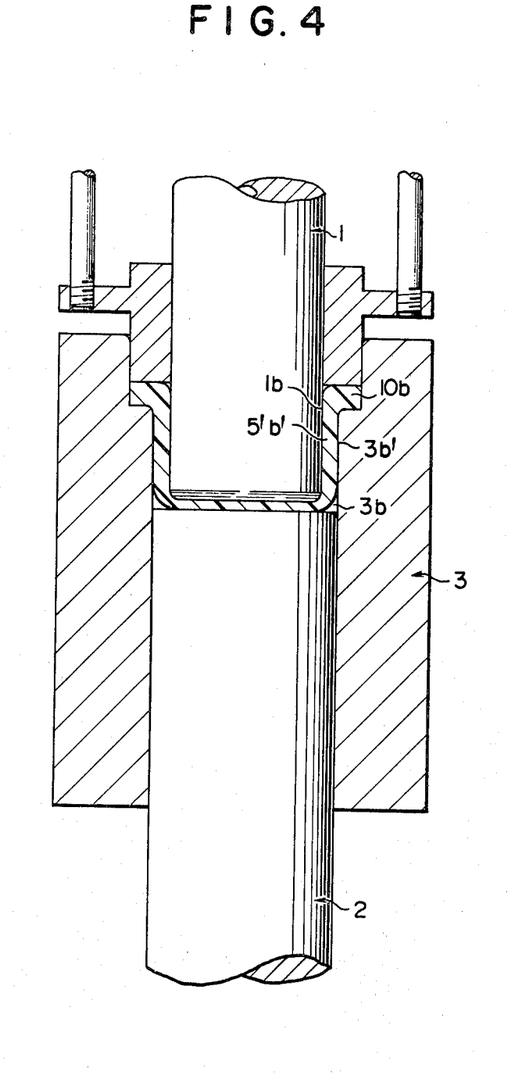
FIG. 4 is a vertical sectional view showing the device as shown in FIG. 1 which is in the former stage of forming.

After clamping, the upper plunger 1 and the lower plunger 2 are brought into contact with the central portion 10a of the plastic material stock 10, as shown in FIG. 2. Then, the upper plunger 1 and the lower plunger 2 compressing the central portion 10a are moved together downward into the lower cavity 3b, as shown in FIG. 4. In the former stage of the downward movement (usually to about 20 to 40% of the total stroke), the compressing force is kept relatively high so that the material of the central portion 10a is forced out of between the two plungers, and the plastic material thus forced out fills the space between the inside surface 3b′ of the lower cavity 3b and the side surface 1b of the upper plunger 1, thus forming the sidewall portion 5′b′, as shown in FIG. 4. In other words, in the former stage of the downward movement, the plastic mateial is accumulated in the aforesaid space. Following the former stage of the downward movement, the two plungers continue to move downward with a decreased compressing force, so that the amount of the plastic material which is forced out of between the two plungers decreases. As the result, the plastic material forming the sidewall portion 5′b′ is subjected to tension and the sidewall portion 5′b′ is drawn in the axially direction.

Thus, in the later stage (following the former stage) of the downward movement, the sidewall portion 5′b is formed with the material which is supplied by drawing the sidewall portion 5′b′, and the material which is forced out of between the two plungers in the later stage.

On completion of the downward movement, or at the time when the hollow preform 5′ has been formed, a gap 12 is formed between the sidewall portion 5′b and the inside surface 3b₁ of the lower cavity 3b. Thus, the sidewall portion 5′b of substantially uniform thickness can be formed by suitably controlling the compressing force and the rate of downward movement. In this manner, it is possible to produce the sidewall portion 5′b as thin as 0.1 to 0.2 mm. In the later stage of the downward movement, the compressing force is comparatively low as mentioned above, and consequently, the bottom wall portion 5′c is relatively thick (for example, about 1 mm), and the corner 5′d is prevented from breakage due to tension in the forming process. If the compressing force is kept high until the later stage of the downward movement, the bottom wall portion 5′c is thinned or the corner 5′d is thinned, with the resulting breakage. Even in case where no breakage takes place, if the resulting plastic hollow article 5 is thin (especially less than 0.3 mm) in bottom wall thickness, it tends to undergo thermal deformation, forming wrinkles at the corner 5d when it is retort sterilized after it has been hermetically sealed. That the bottom wall portion 5c is thin (less than about 1 mm) tends to result in the decrease of resistance to deformation caused by an external force directed inwardly radially, of the plastic hollow article 5. In addition, it involves a problem that the bottom wall portion 5c swells when the plastic hollow article 5 is retort sterilized. If the downward movement is performed with a comparatively low compression force from its beginning, the amount of the plastic material for the sidewall portion, which is supplied only from the plastic material corresponding to the central portion 10a between the two plungers, will become short for the given speed of downward movement. This causes the sidewall portion to be subjected to a large tension, resulting in breakage of the sidewall portion when it is low in temperature during the forming process, or whitening of the sidewall portion owing to microcracks generated on the surface layer thereof when it is high in temperature during the forming process.

During the downward movement, the plastic material which forms the bottom wall portion 5c and the sidewall portion 5b is in contact with the upper plunger 1 which is kept at an approximate molecularly orientable temperature ($T_1$), and, in addition, the plastic material rises in temperature due to working heat. Therefore, the plastic material can be kept at a molecularly orientable temperature thereof during forming even though the plastic material stock 10 is not preheated. The approximate molecularly orientable temperature ($T_1$) means, as stated before, a temperature which is higher than a temperature about 20° C. lower than the lower limit of ($T_L$) the molecularly orientable temperatures and is lower than a temperature about 60° C. higher than the upper limit (Tu) of the molecularly orientable temperature, preferably a temperature which is higher than a temperature about 20° C. higher than the lower limit ($T_L$) and is lower than a temperature about 20° C. higher than the upper limit (Tu). If $T_1$ is about 20° C. or more lower than $T_L$ and the plastic material stock 10 is not preheated, it is difficult for the plastic material under forming to rise in temperature up to the molecularly orientable temperature. On the other hand, if $T_1$ is about 60° C. or more higher than Tu, the plastic material under forming exceeds in temperature the molecularly orientable temperature, regardless of preheating. This is not preferable. Even in case where $Tu < T_1 \leq Tu +$ about 60° C., it is possible to keep the plastic material under forming at a molecularly orientable temperature, if the forming speed is large, since the plastic material is in contact with the upper plunger 1 in only a short time.

During the forming process, the inside surface $3b_1$ of the lower cavity $3b$ and the top surface $2a$ of the lower plunger 2 are preferably heated by a built-in heater (not shown) to a temperature which is somewhat (usually about 20 to 50° C.) lower than the lower limit ($T_L$) of the molecularly orientable temperature, for example, in the case of polypropylene, to about 70 to 100° C. If the temperature of the inside surface $3b_1$ and the top surface $2a$ is lower than the above-mentioned temperature, it will be difficult to keep the plastic material under forming at the molecularly orientable temperature thereof.

Figure 6:
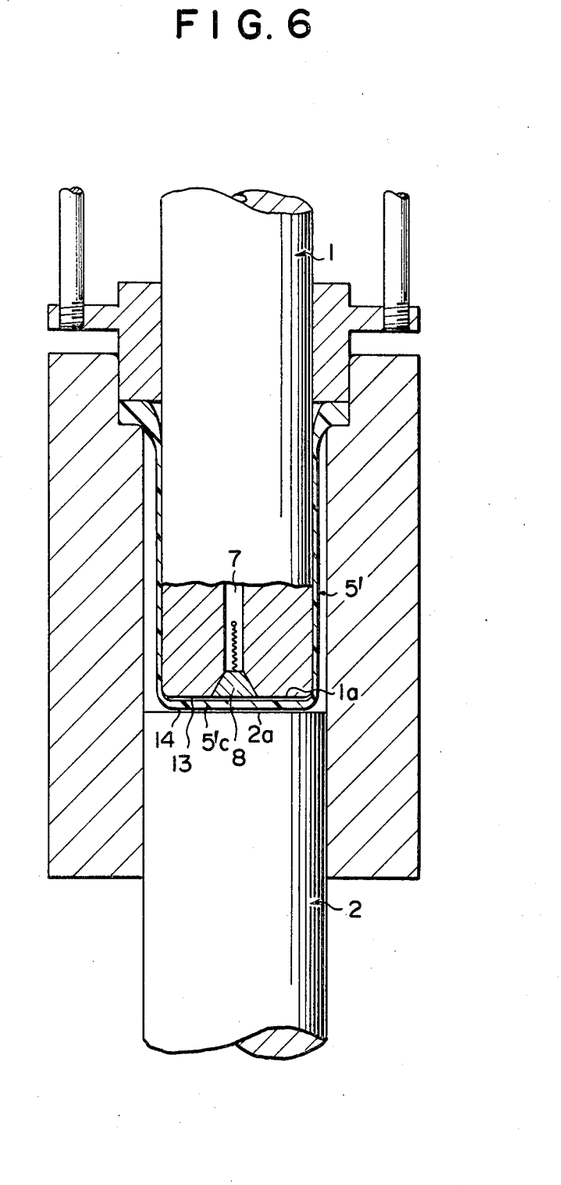
FIGS. 6, 7, and 8 are vertical sectional views showing the device as shown in FIG. 1 which are in the stages of just before blow molding, during blow molding, and having finished blow molding, respectively.

After the hollow preform $5'$ has been formed, the upper plunger 1 is moved upward and, preferably, the lower plunger 2 is simultaneously moved downward a little (for example, about 5 mm). The reason for this is given below. When the upper plunger 1 has just been raised, the plug 8 still keep closing the opening of the bore 7 due to time lag, as shown in FIG. 6. Therefore, vacuum occurs in the gap 13 formed between the bottom surface $1a$ of the upper plunger 1 and the bottom wall portion $5'c$. This vacuum tends to deform inwardly the bottom wall portion $5'c$ which is still at molecularly orientable temperature. This vacuum force is offset when the lower plunger 2 is lowered a little, because vacuum occurs also in the gap 14 formed between the bottom wall portion $5'c$ and the top surface $2a$ of the lower plunger. Thus, the pressures above and below the bottom wall portion $5'c$ are balanced, and the aforesaid deformation can be prevented.

Figure 7:
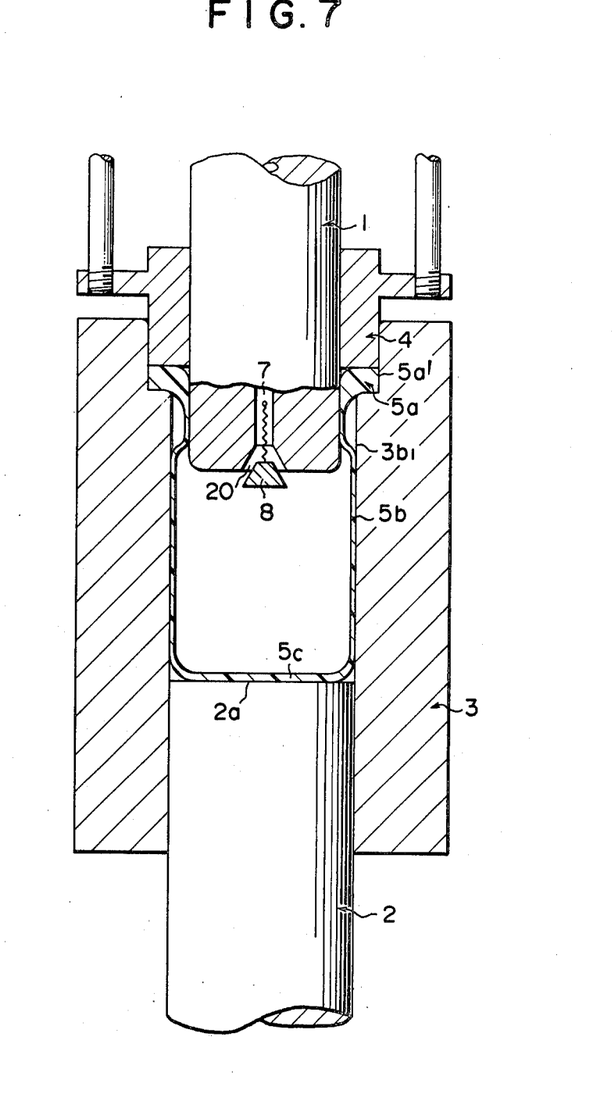
Figure 8:
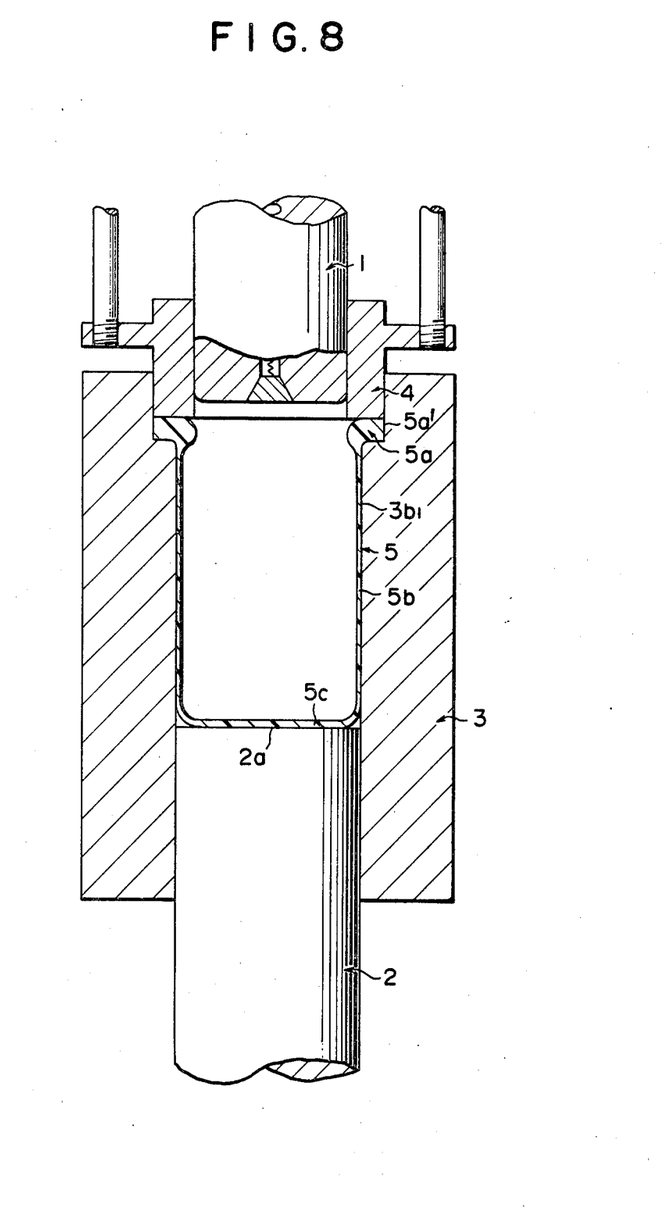

As the upper plunger 1 is further moved upward, the plug 8 is forced down by air pressure, as shown in FIG. 7. Compressed air is blown through the gap 20 between the plug 8 and the opening of the bore 7. This compressed air accomplishes blow molding of the hollow preform $5'$. Namely, the bottom wall portion $5'c$ is brought into close contact with the top surface $2a$ of the plunger 2, and the sidewall portion $5'b$ is brought into close contact with the inside surface $3b_1$ of the lower cavity. As the result, they are cooled to a temperature lower than the molecularly orientable temperature, and solidified. Thus, the plastic hollow article 5 having the flange portion $5a$, the sidewall portion $5b$, and the bottom wall portion $5c$ is formed, as shown in FIG. 8. Thereafter, the upper plunger 1 continues to move upward, and the clamping pad 4 and the lower plunger 2 are moved upward. Finally, the plastic hollow article 5 is removed from the die 3.

The plastic hollow article 5 thus obtained can have a large ratio of the height to the diameter (the outside diameter of the sidewall portion $5b$), for example, of about 1.5 to 3, the sidewall portion $5b$ of thin and uniform thickness (about 0.1 to 0.3 mm), and improved container properties such as strength, transparency and gas barrier due to molecular orientation. Needless to say, according to the method of this invention, it is possible to produce the plastic hollow article 5 having the sidewall portion $5b$ as thick as about 0.4 to 1.0 mm where necessary.

The plastic hollow article 5 produced as mentioned above usually has a considerably thick (about 2 to 6 mm) flange portion $5a$, which is substantially as thick as the plastic material stock 10 used. In addition, the side surface $5a'$ of the flange portion $5a$ (in FIG. 8) remains almost as rough as it was when the plastic material stock 10 was punched. Such a thick and rough flange is inconvenient for double seaming a metal lid (not shown) or for clinching a metal cap (not shown). In addition, in case where a lid made of plastic sheet or film (including a laminate with a metal foil) is heat-sealed, the appearance of the side surface $5a'$ is poor. To overcome these problems, the following measures are taken.

Figure 10A:
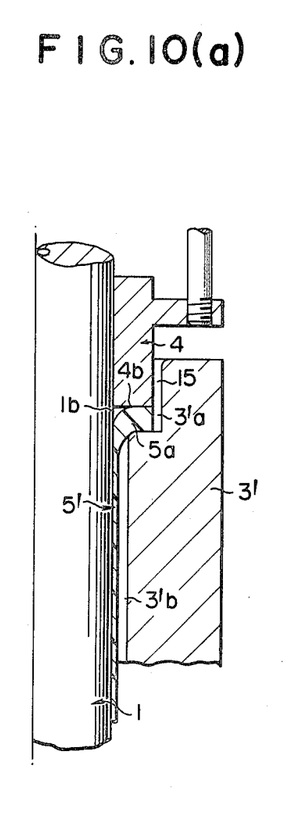
Figure 10B:
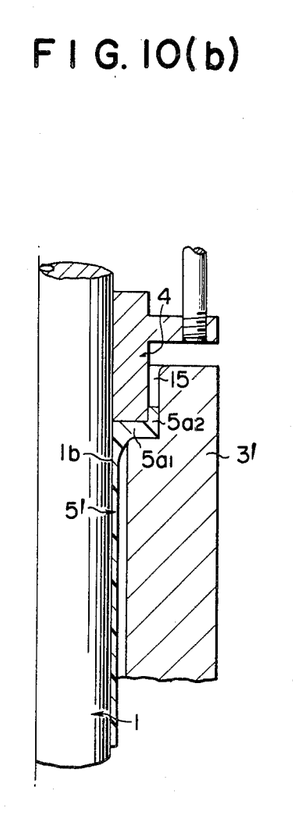
Figure 11A:
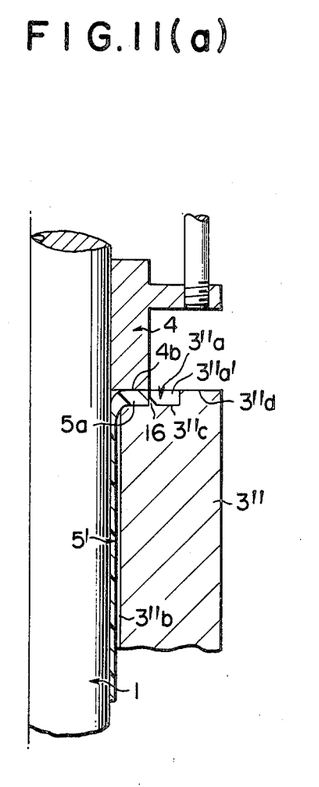
Figure 11B:
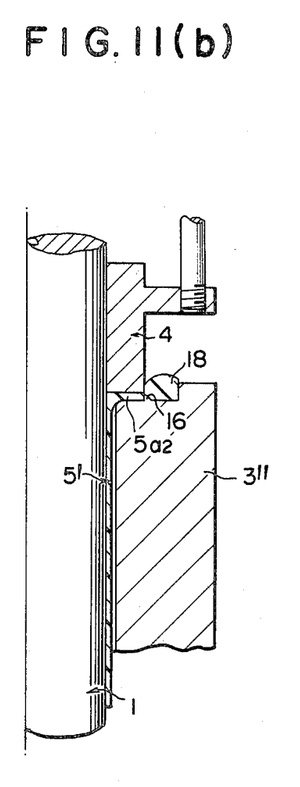

Referring now to FIG. 10 and FIG. 11, there are shown sectional views illustrating the methods for thinning the flange portion $5a$. In FIG. 10 $(a)$, the inside diameter of the upper cavity $3'a$ of the die $3'$ is a little greater than the outside diameter of the clamping pad 4 so that the gap 15 is formed. The bottom surface $4b$ of the clamping pad 4 is heated by a built-in heater (not shown) to a temperature almost equal to that of the side surface $1b$ of the upper plunger 1. If the clamping pad 4 is allowed to compress the flange portion 5 after the upper plunger 1 has finished its downward movement, the plastic material forming the flange portion $5a$ is forced into the gap 15 as shown in FIG. 10 $(b)$. In this specification, the flow of the material in the gap 15 is also referred to as the flow in the radial, outward direction. In this manner, it is possible to form the flange portion $5a_1$ having a prescribed thickness and the vertical portion $5a_2$ extending from the flange portion $5a_1$. The vertical portion $5a_2$ is cut off from its base. If the gap 15 is wide or the compression is small, the vertical portion $5a_2$ may not be formed. The compression by the clamping pad 4 may be performed, before the upper plunger 1 is moved downward, or while moving downward, in the lower cavity $3'b$.

In FIG. 11 $(a)$, the top surface $3''d$ of the die $3''$ is at almost the same level as the bottom surface $4b$ of the clamping pad 4, and the outside diameter of the upper cavity $3''a$ is much greater than the outside diameter of the bottom surface $4b$ and flange portion $5a$ (both are almost the same). The step $3''c$ is provided with a small annular wedge-shaped protrusion 16 which surrounds the flange $5a$. The height of the small protrusion 16 is about equal to the height of the flange portion $5a_2$ after compression. When the clamping pad 4 is allowed to compress the flange $5a$ after the upper plunger 1 has finished its downward movement, the plastic material is forced into the upper cavity $3''a'$ outside the small protrusion 16. The plastic material which has entered the upper cavity $3''a'$ can be easily separated from the thin-walled flange portion $5a_2$. As in the case of FIG. 10, this compression can be accomplished, before the upper plunger 1 is moved downward, or while the upper plunger 1 is moving downward, in the lower cavity $3''b$.

Figure 12A:
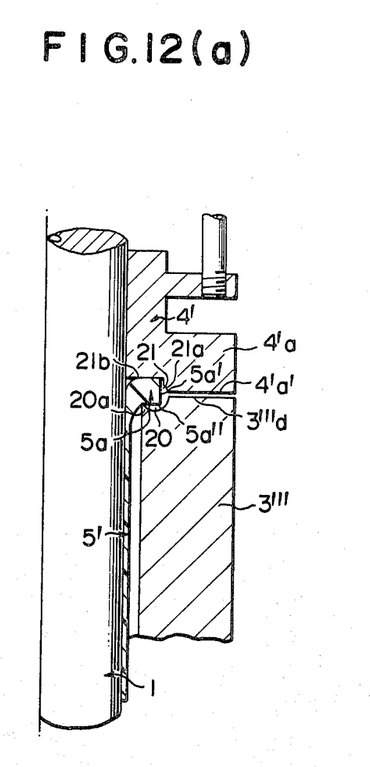
Figure 12B:
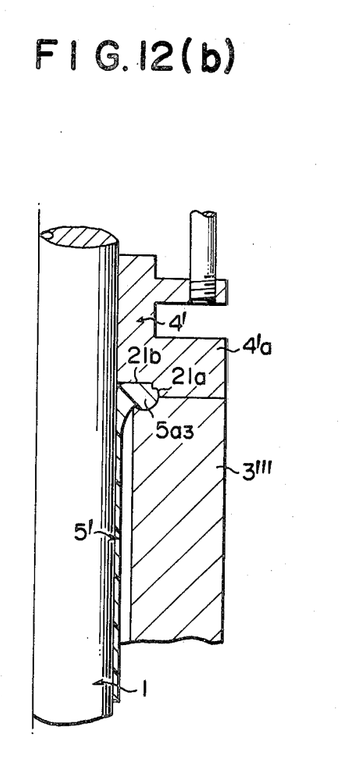

FIG. 12 shows a device for shaping the side surface $5a'$ and bottom surface $5a''$ of the flange portion $5a$. As shown in FIG. 12 $(a)$, a recess 20 of the shape corresponding to the lower half portion of the shaped flange portion $5a_3$ is formed on the inside portion of the top surface $3'''d$ of the die $3'''$, and the recess 20 is provided at its innermost side with a protrusion $20a$ which clamps the flange portion $5a$ (that is, the peripheral portion $10b$). The clamping pad $4'$ is provided with a flange portion $4'a$. At the inside portion of the bottom surface 4'a' of the flange portion 4'a is formed a recess 21 having the side 21a of the shape corresponding to the upper half portion of the shaped flange portion 5a₃. The upper surface 21b of the recess 21 is a plane which is a little wider than the width of the flange portion 5a. When the flange portion 5a is compressed by the clamping pad 4' until the bottom surface 4'a' of the flange portion 4'a of the clamping pad 4' comes into contact with the die 3''', after the upper plunger 1 has finished its downward movement (as in FIG. 12), or before the upper plunger 1 is moved downward, or while the upper plunger 1 is being moved downward, it is possible to obtain the flange portion 5a₃ having the side surface 5a' and the bottom surface 5a'' shaped as shown in FIG. 12 (b), that is, having a predetermined sectional configuration.

The flange portion 5a may be thinned by compressing the peripheral portion 10b with the clamping pad 4 with the clamping or pressing force increased while the upper plunger 1 is moving downward in the lower cavity 3b, preferably in the aforesaid later stage of the downward movement, such that the plastic material of the flange portion flows towards the sidewall portion 5'b, using the device of the type shown in FIG. 1. The flange portion 5a can also be thinned by compressing the flange 5a with the clamping pad 4 and simultaneously lowering the upper plunger 1 and the lower plunger 2 as much as the increase of the height of the sidewall portion 5'b which has been caused by the above compression, after the hollow preform 5' has been formed as shown in FIG. 5.

In the above cases, although the plastic material of the peripheral portion 10b is compressed and flows radially inwardly, since the compression is performed after the bottom surface 1a of the upper plunger 1 has been brought into contact with the top surface 10c of the plastic material stock 10, rupture at the boundary of the sidewall portion 5'b and the flange portion 5a or its vicinity will not occur. In case where the flange portion is compressed or shaped as mentioned above, the plastic material stock 10 may not necessarily be circular, but it is possible to obtain a circular flange portion from a polygonal (for instance, hexagonal) stock. In these cases of compressing or shaping the flange portion, the bottom surface 4b of the clamping pad 4, or the side surface 21a and the upper surface 21b of the recess 21 of the clamping pad 4' are kept at a temperature about equal to that of the side surface 1b of the upper plunger 1.

The above-mentioned examples are concerned with the production of plastic hollow articles having a cylindrical sidewall. Needless to say, the method of this invention makes it possible to produce plastic hollow articles having a square or any other section by changing the shapes of the cavity and the plungers.

The central portion of the plastic material stock may be also forced into the die cavity by moving simultaneously the die 3 and the clamping pad 4 upwardly substantially without moving the upper plunger 1 and the lower plunger 2 (except a slight movement resulting from the compression of the stock). Compressed air (or compressed fluid) may be also blown into the hollow preform 5' through the side surface 1b of the plunger 1, although this method is not shown.

The invention will be illustrated by the following examples.

EXAMPLE 1

A plastic material stock was prepared by punching a circular blank of 60 mm in diameter, from a 3 mm thick polypropylene sheet having a melt flow index (measured at 230° C.) of 0.9 g/10 min and a melting point (measured by the differential thermal analysis) of 164° C. The device of the type as shown in FIG. 1 was heated by the built-in heaters so that the surface temperatures of the upper plunger 1 (of 51.4 mm dia.), the lower plunger 2 (of 53.0 mm dia.), and the lower cavity 3b (of 53.05 mm I.D.) are 155° C., 100° C., and 75° C., respectively.

The polypropylene stock (or blank) at room temperature (30° C.) was placed in the upper cavity and then the peripheral portion of the stock was clamped by the clamping pad with a pressure of 10 kg/cm². Thereafter, the central portion of the stock was forced into the lower cavity at a rate of 50 mm/sec by means of the upper plunger and the lower plunger, with a pressure of 1120 kg/cm² applied to the central portion of the stock. The pressure on the central portion of the stock was reduced to 200 kg/cm² when the top surface of the lower plunger came to the position 25 mm apart from the upper end of the lower cavity. The upper plunger and the lower plunger were moved further downward until the top surface of the lower plunger came to the position 100 mm apart from the upper end of the lower cavity.

Then the upper plunger was moved upward and compressed air of 10 kg/cm² was introduced so that the sidewall portion of the hollow preform was separated from the side surface of the upper plunger and pressed against the surface of the lower cavity. In this state, the sidewall portion and the bottom wall portion were cooled and solidified. Thereafter, the clamping pad and the lower plunger were moved upward. There was obtained a highly transparent container having a sidewall portion 0.3 mm thick and 99 mm high.

EXAMPLE 2

Two circular blanks of 60 mm in diameter were punched from a 1 mm thick polypropylene sheet having a melt flow index of 0.4 g/10 min and a melting point of 163° C. One circular blank of 60 mm in diameter was punched from a 1 mm thick symmetrical five-layered laminate of A/B/C/B/A construction, where A is a polypropylene layer having a melt flow index of 6 g/10 min and a melting point of 165° C., B is an adhesive layer of maleic anhydride-modified polypropylene having a melting point of 162° C., and C is an oxygen barrier layer about 85 μm thick of ethylene-vinyl alcohol copolymer containing 70 mol% of vinyl alcohol and having a melting point of 182° C. The blanks were preheated to 155° C. in an oven.

Using the same device as used in Example 1 (with the upper plunger etc. heated to the same temperature as in Example 1), the preheated blanks were placed in the upper cavity, with the polypropylene blanks outside. The peripheral portion of the blanks (or the stock) was clamped by the clamping pad with a pressure of 10 kg/cm². Thereafter, the central portion of the stock was forced into the lower cavity at a rate of 50 mm/sec by means of the upper plunger and the lower plunger, with a pressure of 320 kg/cm² applied to the central portion of the stock. The pressure on the central portion of the stock was reduced to 90 kg/cm² when the top surface of the lower plunger came to the position 25 mm apart from the upper end of the lower cavity. The upper plunger and the lower plunger were moved further downward until the top surface of the lower plunger came to the position 100 mm apart from the upper end of the lower cavity.

Then the upper plunger was moved upward and compressed air of 10 kg/cm² was introduced so that the sidewall portion of the hollow preform was separated from the side surface of the upper plunger and pressed against the surface of the lower cavity. In this state, the sidewall portion and the bottom wall portion were cooled and solidified. Thereafter, the clamping pad and the lower plunger were moved upward. There was obtained a highly transparent container having a sidewall portion 0.3 mm thick and 99 mm high. The container was outstanding in oxygen barrier. It was found that the sidewall portion and the bottom wall portion were completed bonded together, though the stock consisting of three blanks simply placed one over another was employed.

What is claimed is:

1. A method of making a plastic hollow article having a flange portion, a sidewall portion and a bottom wall portion, at least said sidewall portion being molecularly oriented, which comprises clamping a peripheral portion corresponding to said flange portion of a flat, molecularly orientable plastic material stock of substantially uniform thickness having a temperature below the upper limit of the molecularly orientable temperatures of said plastic material, such that the material of the peripheral portion will not flow radially, inwardly; thereafter introducing the central portion of said plastic material stock substantially corresponding to said bottom portion into a die cavity by moving a first plunger and a second plunger in said die cavity while compressing said central portion between said first plunger and said second plunger, said first and second plungers being moveable between an original position and a second position, said die cavity having a straight, axially extending inside surface with a clearance between said inside surface and a side surface of said first plunger being larger than the thickness of a sidewall portion of a hollow preform to be formed, such that the compressing force by the first plunger and the second plunger is kept comparatively high in a beginning stage of introducing the plastic material stock into the die cavity, thereby causing the plastic material forced out to substantially fill the space between the first plunger and the inside surface of said die cavity, and thereafter the compressing force is reduced and said introducing is continued to said position thereby permitting the filled plastic material to be drawn in the axial-direction, to form a hollow preform having a sidewall portion made from the plastic material which has been forced out from between the first plunger and the second plunger, said sidewall portion being kept in contact with the side surface of the first plunger kept at about molecularly orientable temperature; withdrawing the first plunger from said second plunger to said original position thereof and supplying a fluid under pressure, during said withdrawing, into said hollow preform to expand radially said sidewall portion, so that said sidewall portion is brought into contact with the inside of said die cavity kept at a temperature below the lower limit of said molecularly orientable temperatures for cooling and solidifying, whereby said sidewall portion of said plastic hollow article is formed from said sidewall portion of said hollow preform.

2. A method of making a plastic hollow article as claimed in claim 1, which further comprises compressing the peripheral portion prior to introducing the central portion into the die cavity in such a manner that the plastic material of said peripheral portion flows substantially radially outwardly, whereby a thin flange portion is formed.

3. A method of making a plastic hollow article as claimed in claim 1, which further comprises compressing the peripheral portion prior to introducing the central portion into the die cavity in such a manner that the plastic material of said peripheral portion flows substantially radially outwardly, whereby a flange portion having a predetermined sectional configuration is formed.

4. A method of making a plastic hollow article as claimed in claim 1, which further comprises compressing the peripheral portion during introducing the central portion into the die cavity in such a manner that the plastic material of said peripheral portion flows substantially radially outwardly, whereby a thin flange portion is formed.

5. A method of making a plastic hollow article as claimed in claim 1, which further comprises compressing the peripheral portion during introducing the central portion into the die cavity in such a manner that the plastic material of said peripheral portion flows substantially radially outwardly, whereby a flange portion having a predetermined sectional configuration is formed.

6. A method of making a plastic hollow article as claimed in claim 1, which further comprises compressing the peripheral portion after forming the hollow preform and prior to returning the first plunger in such a manner that the plastic material of said peripheral portion flows substantially radially outwardly, whereby a thin flange portion is formed.

7. A method of making a plastic hollow article as claimed in claim 1, which further comprises compressing the peripheral portion after forming the hollow preform and prior to returning the first plunger in such a manner that the plastic material of said peripheral portion flows substantially radially outwardly, whereby a flange portion having a predetermined sectional configuration is formed.

8. A method of making a plastic hollow article having a flange portion, a sidewall portion and a bottom wall portion, at least said sidewall portion being molecularly oriented, which comprises initially clamping a peripheral portion corresponding to said flange portion of a flat, molecularly orientable plastic material stock of substantially uniform thickness having a temperature below the upper limit of the molecularly orientable temperatures of said plastic material, such that the material of the peripheral portion will not flow radially, inwardly; thereafter introducing the central portion of said plastic material stock substantially corresponding to said bottom portion into a die cavity by moving a first plunger and a second plunger in said die cavity while compressing said central portion between said first plunger and said second plunger, said first and second plungers being moveable between an original position and a second position, said die cavity having a straight, axially extending inside surface with a clearance between said inside surface and a side surface of said first plunger being larger than the thickness of a sidewall portion of a hollow preform to be formed, such that the compressing force by the first plunger and the second plunger is kept comparatively high in a beginning stage of introducing the plastic material stock into the die cavity, thereby causing the plastic material forced out to substantially fill the space between the first plunger and the inside surface of said die cavity, and thereafter the compressing force is reduced and said introducing is continued, thereby permitting the filled plastic material to be drawn in the axial direction, to form a hollow preform having a sidewall portion made from the plastic material which has been forced out from between the first plunger and the second plunger, said sidewall portion being kept in contact with the side surface of the first plunger kept at about molecularly orientable temperature; subsequently compressing said peripheral portion in such a manner that the plastic material thereof flows radially, inwardly towards said sidewall portion, and simultaneously further introducing the first plunger and the second plunger into said die cavity, to said second position thereby to form additionally the upper portion of the sidewall portion of said hollow preform; withdrawing the first plunger from said second to said original position thereof and supplying a fluid under pressure, during said withdrawing, into said hollow preform to expand radially said sidewall portion, so that said sidewall portion is brought into contact with the inside surface of said die cavity kept at a temperature below the lower limit of said molecularly orientable temperatures for cooling and solidifying, whereby said sidewall portion of said plastic hollow article is formed from said sidewall portion of said hollow preform.

9. A method of making a plastic hollow article as claimed in claim 1, 2, 3, 4, 5, 6, 7 or 8, wherein the plastic material stock is composed of non-integral plastic sheets of the same kinds placed one over another without bonding therebetween.

10. A method of making a plastic hollow article as claimed in claims 1, 2, 3, 4, 5, 6, 7 or 8, wherein the plastic material stock is composed of non-integral plastic sheets of the different kinds placed one over another without bonding therebetween.

11. A method of making a plastic hollow article as claimed in claim 1, 2, 3, 4, 5, 6, 7, or 8 wherein the plastic material stock is at normal room temperature without preheating, immediately prior to clamping the peripheral portion thereof.

12. A method of making a plastic hollow article as claimed in claim 1, 2, 3, 4, 5, 6, 7, or 8 wherein the side surface and the bottom surface of the first plunger are kept during introducing into the die cavity at a temperature lower than a temperature higher about 60° C. than the upper limit of the molecularly orientable temperatures and higher than a temperature lower about 20° C. than the lower limit of said molecularly orientable temperatures.

13. A method of making a plastic hollow article as claimed in claim 1, 2, 3, 4, 5, 6, 7, or 8 wherein the inner surface of the die cavity is kept at temperatures lower about 20° to 50° C. than the lower limit of the molecularly orientable temperatures.

14. A method of making a plastic hollow article as claimed in claim 1, 2, 3, 4, 5, 6, 7, or 8, wherein said clearance is from 0.2 mm. to 0.8 mm.

15. A method of making a plastic hollow article as claimed in claim 1, 2, 3, 4, 5, 6, 7, or 8, wherein simultaneously with said first plunger beginning to withdraw, said second plunger is moved a small amount from said second position in a direction opposite of the withdrawal.

* * * * *